Dec. 29, 1925                                           1,567,556
                    E. TRENCKMANN ET AL
     BALLOON ENVELOPE MATERIAL AND PROCESS OF MANUFACTURING THE SAME
                      Filed August 27, 1921
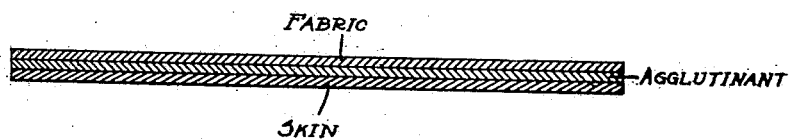
Inventors:
Erich Trenckmann,
Bruno Trenckmann,
By their attorney, Charles J. Gooding Patented Dec. 29, 1925.

1,567,556

UNITED STATES PATENT OFFICE.

ERICH TRENCKMANN AND BRUNO TRENCKMANN, OF BERLIN-TEMPELHOF, GERMANY, ASSIGNORS TO B. G. TEXTILWERKE G. M. B. H., OF BERLIN-TEMPELHOF, GERMANY.

BALLOON-ENVELOPE MATERIAL AND PROCESS OF MANUFACTURING THE SAME.

Application filed August 27, 1921. Serial No. 495,934.

(GRANTED UNDER THE PROVISIONS OF THE ACT OF MARCH 3, 1921, 41 STAT. L., 1313.)

*To all whom it may concern:*

Be it known that we, ERICH TRENCKMANN and BRUNO TRENCKMANN, citizens of the German Republic, residing at Berlin-Tempelhof, Germany, have invented certain new and useful Improvements in and Relating to Balloon-Envelope Materials and Processes of Manufacturing the Same (for which we have filed applications in Germany, March 3, 1916, and September 22, 1917; Austria, September 10, 1918; Great Britain, March 3 and 4, 1920; France, February 10, 1920; Hungary, October 19, 1918; Japan, May 20, 1920, and Italy, June 24, 1920), of which the following is a specification.

Our invention refers to balloon envelope material and its particular object is to effect a saving in the materials hitherto in use for this purpose without sacrificing any advantages offered by these materials.

As is well known to those skilled in the art, the material used up to date in the manufacture of balloon envelopes consisted either of waterproofed cloth or of goldbeaters' skin or the like. Rubbered material involved the drawback of being too heavy in weight. On the other hand animal products, such as goldbeaters' skin, were too sensitive against friction, too little resistive to ripping and not sufficiently gas-tight. For all these reasons animal products, such as skins and intestines have to be employed in a number of superposed layers, this way of proceeding, however, leading to an enormous consumption of material so that it proved impossible to satisfy the demand. It is clear that a great saving in valuable material could be effected, if it were possible to improve the animal or vegetable material or both, which have been used up till now, in such a manner as to render them practically gastight without materially increasing their weight and without impairing their elasticity and mechanical power of resistance.

We have now ascertained that by combining the materials used up till now, animal as well as vegetable, with a mixture described and claimed in our co-pending application for patent of the United States filed August 27, 1921, Serial No. 495,935, said mass substantially consisting of a mixture of a substance having the principal characteristics of glue and a substance adapted to impart to it elasticity. The properties of the fabric as well as goldbeaters' skin or other vegetable or animal material used in the manufacture of balloon envelopes are so greatly improved that the number of layers required for the envelope can be greatly reduced so that a great part of the material is saved. Our invention therefore consists in a fabric to be used in combination with goldbeaters' skin or some other suitable animal product of a similar character, such fabric being treated with a mixture in such a manner that the mixture acts as a means for impregnating the fabric so as to render it gastight and as an agglutinant for uniting the layers of fabric and goldbeaters' skin or the like.

The figure of the drawing illustrates a sectional view of a portion of the material of this invention.

In the case where it is desired to combine fabric with goldbeaters' skin or some other animal product of similar properties, we prefer proceeding as follows: The animal product such as goldbeaters' skin having been prepared by gluing a number of single skins together so as to form a number of superposed layers which are then dried, is moistened by means of a wet rag and then stretched on a table or frame. This treatment is designed to cause a preliminary elongation of the skin which is however prevented from contracting, while drying, beyond its original size owing to the fact that it is fixed on all four sides. Thus a drawback is obviated which generally presented itself whenever a fabric was united with the skin, the agglutinant used for this purpose causing the skin to elongate considerably, such elongation being however followed by a contraction which caused the layers of fabric and skin to separate as soon as the compound material was subjected to any stress or pressure. This is successfully avoided by the treatment described above which may then be followed by the application of the fabric, the agglutinant having been in the meantime applied by means of a brush to the skin. Preferably pressure is applied to the fabric by a squeeze-roller. In order to render the products thus obtained waterproof, their inner and outer surfaces preferably receive a coating of a good balloon varnish. The agglutinant which we prefer to use is a mixture which is spread on the fabric by means of well known spreading appliances, such mixture consisting of glue, preferably bone-glue or some material having the principal characteristics of glue, such as isinglass, casein or gelatine, and a substance or substances adapted to render the glue as well as the fabric, to which it is applied, elastic, amongst such substances being oils, either soluble or insoluble, in water, further insoluble fatty acids, glycerine and the like. The preferred mixture consists of 100 parts water, 10 parts gelatine, 10 parts Turkey red oil or turcon oil, this being a substitute for the former, and five parts glycerine, 0.25 part bi-chromate of potash or formaldehyde being added, if desired, in order to render the mixture highly waterproof.

In the compound material thus obtained the fabric serves for compensating the low resistance to ripping and the general sensitiveness of the animal products, while the layers of goldbeaters' skin or the like may be only very few inasmuch as the novel mass not only acts as an agglutinant holding the different layers and materials together but also serves as an impregnating means filling the pores of the fabric and rendering it absolutely gastight.

Apparently all these conditions can be fulfilled only by a mass which is at the same time highly adhesive, light and absolutely gastight. Moreover as goldbeaters' skin elongates about 50% less than the fabric combined therewith the elasticity of the agglutinant must be such that on the balloon envelope being subjected to a tensile stress the difference of elongation is compensated and a splitting off of layers is avoided. Rubber solution cannot be used on account of its insulating qualities. On the other hand vegetable agglutinants are not sufficiently adhesive and the dextrines which are usually employed are too brittle and, if greater quantities of glycerine are added, become hygroscopic and therefore unfit for use with balloon envelope material.

We claim:—

1. The process for making balloon envelope material which consists in moistening a sheet of one or more layers of animal provenience, stretching same, applying a mixture of a substance having the principal characteristics of glue and a substance adapted to render glue elastic, placing a sheet of fabric thereon and applying pressure.

2. The herein described method of manufacturing fabric for the gas bags of airships or balloons which consists in proofing the fabric with a material having the principal characteristic of glue and a material adapted to render glue elastic, and applying a layer of goldbeaters' skin as a lining for such basic material.

3. A process as defined in claim 2 further characterized by the fact that the layer of goldbeaters' skin is varnished after it is applied to the fabric.

4. A balloon envelope material comprising a layer of fabric impregnated with a mixture of a substance having the principal characteristic of glue and a substance adapted to render glue elastic, and a layer of goldbeaters' skin.

5. A balloon envelope material as characterized in claim 4, further characterized by the fact that it comprises a layer of varnish on the goldbeaters' skin.

6. The process for making balloon envelope material which consists in moistening a sheet of one or more layers of animal provenience, stretching same, applying a mixture of a substance having the principal characteristics of glue and a substance adapted to render glue elastic, and placing a sheet of fabric thereon and applying pressure and then applying a coating of varnish thereto.

7. The process for making balloon envelope material which consists in stretching a sheet of one or more layers of animal provenience, applying a mixture of a substance having the principal characteristics of glue and a substance adapted to render glue elastic, and placing a sheet of fabric thereon and applying pressure.

In testimony whereof we hereunto affix our signatures.

ERICH TRENCKMANN.
BRUNO TRENCKMANN.